US009256585B2

(12) United States Patent
Hattori et al.

(10) Patent No.: US 9,256,585 B2

(45) Date of Patent: Feb. 9, 2016

(54) NON-TRANSITORY COMPUTER READABLE MEDIUM STORING DOCUMENT CREATION SUPPORT PROGRAM, DOCUMENT CREATION SUPPORT DEVICE, AND DOCUMENT CREATION SUPPORT METHOD

(75) Inventors: Keigo Hattori, Kanagawa (JP); Hiroshi Umemoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 566 days.

(21) Appl. No.: 13/570,818

(22) Filed: Aug. 9, 2012

(65) Prior Publication Data

US 2013/0238986 A1 Sep. 12, 2013

(30) Foreign Application Priority Data

Mar. 8, 2012 (JP) ................................ 2012-051294

(51) Int. Cl.
*G06F 17/00* (2006.01)
*G06F 17/22* (2006.01)

(52) U.S. Cl.
CPC .................................. *G06F 17/2288* (2013.01)

(58) Field of Classification Search
CPC .................................................. G06F 17/2288
USPC .......................................... 715/256, 255, 205
See application file for complete search history.

(56) References Cited

U.S. PATENT DOCUMENTS 8,589,349 B2 * 11/2013 Grant et al. ................... 707/638
2004/0172377 A1 * 9/2004 Saitou et al. ...................... 707/1
2007/0239802 A1 * 10/2007 Razdow et al. ............... 707/203
2009/0313331 A1 * 12/2009 Rasmussen et al. .......... 709/205
2011/0055702 A1 * 3/2011 Jakobson ...................... 715/723
2011/0197121 A1 * 8/2011 Kletter .......................... 715/234
2012/0005156 A1 * 1/2012 Grant et al. ................... 707/608
2012/0233137 A1 * 9/2012 Jakobson et al. ............ 707/695
2012/0278694 A1 * 11/2012 Washio ......................... 715/205
2012/0284642 A1 * 11/2012 Sitrick et al. .................. 715/753
2013/0185252 A1 * 7/2013 Palmucci ...................... 707/608
2013/0275849 A1 * 10/2013 King et al. .................... 715/229

FOREIGN PATENT DOCUMENTS

JP A-05-101054 4/1993
JP A-2003-308314 10/2003

* cited by examiner

*Primary Examiner* — Stephen Hong
*Assistant Examiner* — Marshon Robinson
(74) *Attorney, Agent, or Firm* — Oliff PLC

(57) ABSTRACT

Provided is a non-transitory computer readable medium storing a document creation support program causing a computer to function as a receiving unit that receives a defined text and edition process information having recorded therein an operation history when creating the defined text including a sentence associated with the operation, a revision range extraction unit that extracts, as a revision range, an operation history corresponding to a preset operation and a sentence associated with the operation history from the edition process information, a document feature quantity extraction unit that extracts first and second feature quantities, and a sentence example information search unit that searches for a sentence example associated with a sentence in sentence example information having a sentence example registered in advance in association with feature quantity information of the sentence example on the basis of information of the first and second feature quantities.

8 Claims, 15 Drawing Sheets

112

COMPOUND NOUN IS CONSTITUTED BY A SERIES OF RADICALS, AND COMPOUND NOUNS CAN BE GENERATED INFINITELY BY COMBINATIONS OF WORDS. FOR THIS REASON, IT IS NOT REALISTIC TO WRITE ALL COMBINATIONS IN ADVANCE.

<rev="24" act="delete" date="20110908:8:50:19:742"><rev="3" act="write"
data="20110906:8:31:21:289">IN JAPANESE,</rev="3"><rev="0" act="write"
data="20110906:8:30:29:114">MANY NOUNS OR AFFIXES CORRESPONDING
TO NOUNS ARE CONNECTED,</rev="0"><rev="1"
act="write" date="20110906:8:30:45:21">, </rev="1"><rev="2" act="write"
date="20110906:8:30:45:810">COMPOUND<rev="4" act="delete"
date="20110906:8:31:24:168">NOUN
</rev="4"><rev="5" act="write" date="20110906:8:31:25:54">WORDS
</rev="5">ARE CREATED WITHOUT LIMIT </rev="2"><rev="6" act="write"
date="20110906:8:33:15:146">¥n¥n</rev="6"><rev="7" act="write"
date="20110906:8:33:15:897">IN AN ACTUAL SENTENCE, OCCURRING IN
A DICTIONARY <rev="8" act="delete"
date="20110906:8:33:21:189"> AS </rev="8">WORDS WHICH ···
BY COMBINING WORDS ··· AND DO NOT OCCUR IN A DICTIONARY
<rev="11" act="delete" cnt1="undo" date="20110906:11:08:43:789">FORMED
</rev="11" ><rev='12" act="write" cnt1="undo" date="20110906:11:08:43:789">
GENERATED
</rev="12" >ARE, <rev="9" act="delete" date="20110906:11:08:02:146>
SO-CALLED</rev="9">COMPOUND WORDS OCCUR A LOT
</rev="7"><rev="10" act="write"

```
date="20110906:11:08:20:561">¥n¥n</rev="10"><rev="13" act="write"
date="20110906:11:11:13:123">COMPOUND WORD IS FORMED BY TWO OR
MORE ROOTS IN A WORD CONSTRUCTION</rev="13"><rev="14" act="write"
date="20110906:11:11:20:146">¥n¥n</rev="14"></rev="24" ><rev="15" act="write"
date="20110907:08:30:29:114">COMPOUND<rev="16" act="delete"
  date="20110907:8:30:49:287">WORD</rev="16"><rev="17" act="write"
  date"20110907:8:30:55:754">NOUN</rev='17">IS A SERIES OF RADICALS
  </rev="15"><rev="18" act="write" date="20110907:8:31:51:516"><rev="19"
  act="delete" date=:20110907:8:55:13:614"> fはううぇがうぇっっはh
</rev="19"></rev='18"><rev="20" act="write" date="20110908:8:31:27:90">COMPOUND
  NOUNS CAN BE GENERATED INFINITELY BY COMBINATIONS OF WORDS.
  </rev="20"><rev="21"> act='write"
  date="20110908:8:31:31:90">FOR THIS REASON, <rev="23" act="write"
  date="20110908:8:32:09:452" link="0">IN ADVANCE
  </rev="23" ALL OF COMBINATIONS<rev="22" act="delete"
  date="20110908:8:31:50:119" link="0"> IN ADVANCE</rev="22">
  IT IS NOT REALISTIC TO WRITE ¥n</rev="21">
```

FIG. 3B

| VARIABLE | VALUE | OUTLINE |
|---|---|---|
| rev | int | MANAGEMENT NUMBER FOR EDITION PROCESS RECORDINGE |
| act | string | write : INPUT OPERATION<br>delete : DELETION OPERATION |
| ctrl | string | undo : UNDO EXECUTION<br>redo : REDO EXECUTION |
| link | int | MANAGEMENT NUMBER OF COPY (CUT) AND PASTE IN THE SAME DOCUMENT |
| date | date | EDITION EXECUTION DATE<br>[yyyy][mm][dd]:[h]:[m]:[s]:[ms]<br>(YEAR, MONTH, DAY, HOUR, MINUTE, SECOND, MILLISECOND) |

- A COMPOUND NOUN IS CONSTITUTED BY A SERIES OF RADICALS, AND COMPOUND NOUNS CAN BE GENERATED INFINITELY BY COMBINATIONS OF WORDS.

112b

- FOR THIS REASON, IT IS NOT REALISTIC TO WRITE ALL COMBINATIONS IN ADVANCE.

FIG. 4B

- [MANY NOUNS OR AFFIXES CORRESPONDING TO NOUNS ARE CONNECTED, AND COMPOUND NOUNS ARE CREATED WITHOUT LIMIT.] ← 113a
- [IN JAPANESE,] MANY NOUNS OR AFFIXES CORRESPONDING NOUNS ARE CONNECTED, AND COMPOUND NOUNS ARE CREATED WITHOUT LIMIT. ← 113b
- IN JAPANESE, MANY NOUNS OR AFFIXES CORRESPONDING TO NOUNS ARE CONNECTED, AND COMPOUND [WORDS] ARE CREATED WITHOUT LIMIT. ← 113c
- [IN AN ACTUAL SENTENCE, WORDS WHICH ARE FORMED BY COMBINING WORDS AS OCCURRING IN A DICTIONARY AND DO NOT OCCUR IN A DICTIONARY, SO-CALLED COMPOUND WORDS OCCUR A LOT.] ← 113d
- IN AN ACTUAL SENTENCE, WORDS WHICH ARE FORMED BY COMBINING WORDS [ ] OCCURRING IN A DICTIONARY AND DO NOT OCCUR IN A DICTIONARY, SO-CALLED COMPOUND WORDS OCCUR A LOT. ← 113e
- IN AN ACTUAL SENTENCE, WORDS WHICH ARE FORMED BY COMBINING WORDS OCCURRING IN A DICTIONARY AND DO NOT OCCUR IN A DICTIONARY, [ ] COMPOUND WORDS OCCUR A LOT. ← 113f
- IN AN ACTUAL SENTENCE, WORDS WHICH ARE [GENERATED] BY COMBINING WORDS OCCURRING IN A DICTIONARY AND DO NOT OCCUR IN A DICTIONARY, COMPOUND WORDS OCCUR A LOT. ← 113g
- [A COMPOUND WORD REFERS TO A WORD WHICH IS FORMED BY TWO OR MORE ROOTS IN A WORD CONSTRUCTION.] ← 113h
- [A COMPOUND WORD IS A SERIES OF RADICALS,] ← 113i
  A COMPOUND [NOUN] IS A SERIES OF RADICALS,
- A COMPOUND NOUN IS A SERIES OF RADICALS, ← 113j
  [fはううぇがうぇっっはh]
- A COMPOUND NOUN IS A SERIES OF RADICALS, [AND COMPOUND NOUNS CAN BE GENERATED INFINITELY BY COMBINATIONS OF WORDS.] ← 113k
- [FOR THIS REASON, IT IS NOT REALISTIC TO WRITE IN ADVANCE ALL COMBINATIONS.] ← 113l
- FOR THIS REASON, IT IS NOT REALISTIC TO WRITE [ ] ALL COMBINATIONS [IN ADVANCE]. ← 113m

FIG. 5A

- A COMPOUND NOUN IS CONSTITUTED BY A SERIES OF RADICALS, AND COMPOUND NOUNS CAN BE GENERATED INFINITELY BY COMBINATIONS OF WORDS. ← 112a

- FOR THIS REASON, IT IS NOT REALISTIC TO WRITE ALL COMBINATIONS IN ADVANCE. ← 112b

FIG. 5B

- [MANY NOUNS OR AFFIXES CORRESPONDING TO NOUNS ARE CONNECTED, AND COMPOUND NOUNS ARE CREATED WITHOUT LIMIT.] ← 103a
- [IN JAPANESE,] MANY NOUNS OR AFFIXES CORRESPONDING TO NOUNS ARE CONNECTED, AND COMPOUND NOUNS ARE CREATED WITHOUT LIMIT. ← 103b
- IN JAPANESE, MANY NOUNS OR AFFIXES CORRESPONDING TO NOUNS ARE CONNECTED, AND COMPOUND [WORDS] ARE CREATED WITHOUT LIMIT. ← 103c
- [IN AN ACTUAL SENTENCE, WORDS WHICH ARE FORMED BY COMBINING WORDS AS OCCURRING IN A DICTIONARY AND DO NOT OCCUR IN A DICTIONARY, SO-CALLED COMPOUND WORDS OCCUR A LOT.] ← 103d
- IN AN ACTUAL SENTENCE, WORDS WHICH ARE FORMED BY COMBINING WORDS [ ] OCCURRING IN A DICTIONARY AND DO NOT OCCUR IN A DICTIONARY, SO-CALLED COMPOUND WORDS OCCUR A LOT. ← 103e
- IN AN ACTUAL SENTENCE, WORDS WHICH ARE FORMED BY COMBINING WORDS OCCURRING IN A DICTIONARY AND DO NOT OCCUR IN A DICTIONARY, [ ] COMPOUND WORDS OCCUR A LOT. ← 103f
- IN AN ACTUAL SENTENCE, WORDS WHICH ARE [GENERATED] BY COMBINING WORDS OCCURRING IN A DICTIONARY AND DO NOT OCCUR IN A DICTIONARY, COMPOUND WORDS OCCUR A LOT. ← 103g
- [A COMPOUND WORD REFERS TO A WORD WHICH IS FORMED BY TWO OR MORE ROOTS IN A WORD CONSTRUCTION.] ← 103h
- [A COMPOUND WORD IS A SERIES OF RADICALS.]
- [FOR THIS REASON, IT IS NOT REALISTIC TO WRITE IN ADVANCE ALL COMBINATIONS.] ← 103i

FEATURE QUANTITY OF DEFINITE SENTENCE 112a

| ID | 1 | 2 | 3 | 4 | 5 | 6 | 7 | 8 |
|---|---|---|---|---|---|---|---|---|
| WORD | COMPOUND NOUN | RADICAL | SERIES | CONSTI- TUTE | WORD | COMBIN- ATION | INFINITE | GENERATE |
| NUMBER OF OCCURRENCES | 2 | 1 | 1 | 1 | 1 | 1 | 1 | 1 |
| RECEIVED WORD ID | 4,8 | 3 | 4 | −1 | 6 | 8 | 8 | −1 |
| ⋮ | ⋮ | ⋮ | ⋮ | ⋮ | ⋮ | ⋮ | ⋮ | ⋮ |

FEATURE QUANTITY OF REVISION SENTENCE 103c

| ID | 17 | 21 | 37 | 61 | 62 | 63 | 64 | 65 | 66 | 67 |
|---|---|---|---|---|---|---|---|---|---|---|
| WORD | NOUN | CORRE-SPOND | CREATE | JAPANESE | AFFIX | MANY | COMPOUND WORD | FINITE | CON-NECT | WITH-OUT |
| NUMBER OF OCCURRENCES | 2 | 1 | 1 | 1 | 1 | 1 | 1 | 1 | 1 | 1 |
| RECEIVED WORD ID | 66,21 | 62 | -1 | 37 | 66 | 66 | 37 | 67 | 37 | 37 |
| ⋮ | ⋮ | ⋮ | ⋮ | ⋮ | ⋮ | ⋮ | ⋮ | ⋮ | ⋮ | ⋮ |

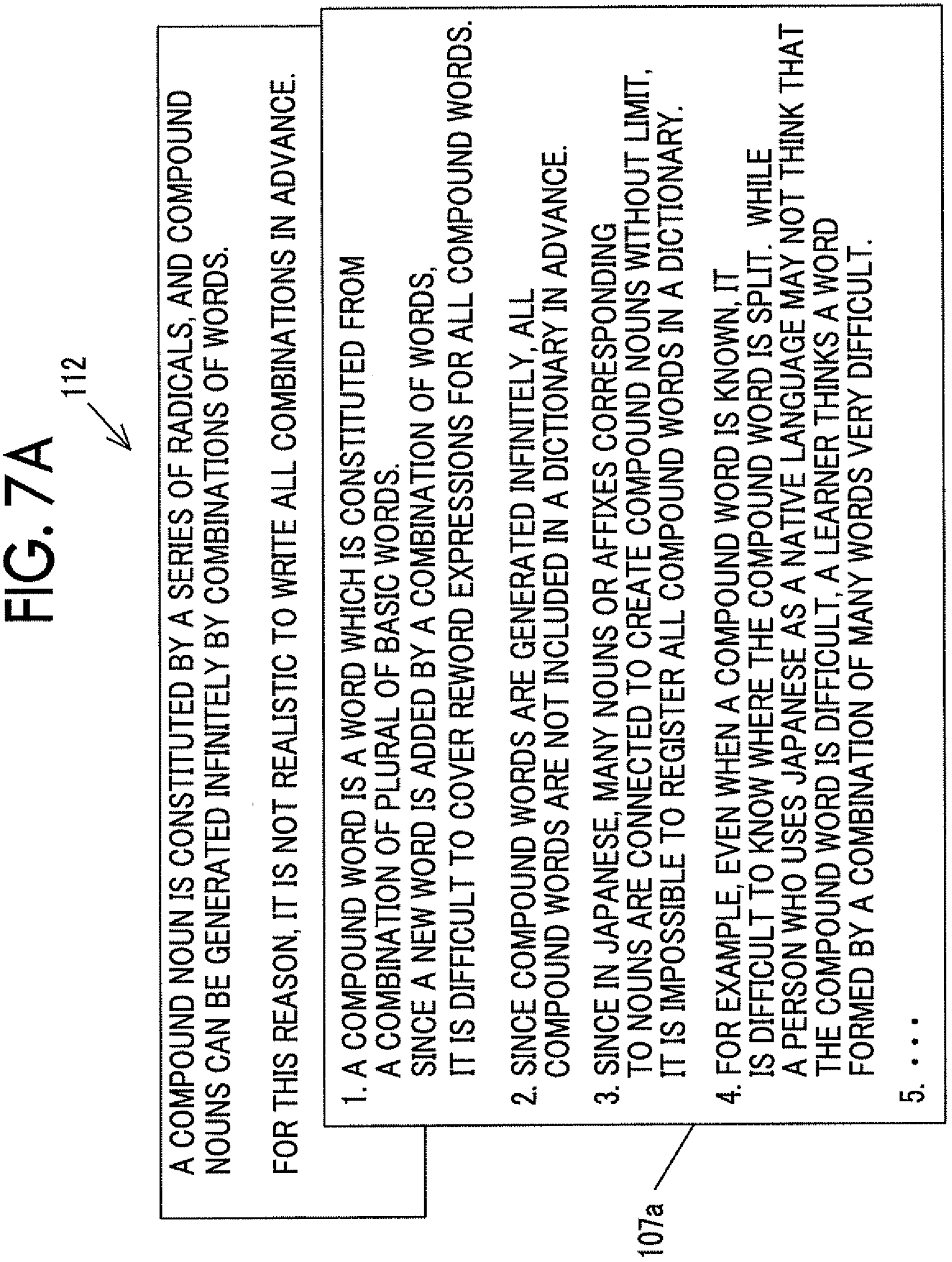

A COMPOUND NOUN IS CONSTITUTED BY A SERIES OF RADICALS, AND COMPOUND NOUNS CAN BE GENERATED INFINITELY BY COMBINATIONS OF WORDS.

FOR THIS REASON, IT IS NOT REALISTIC TO WRITE ALL COMBINATIONS IN ADVANCE.

1. A COMPOUND WORD IS A WORD WHICH IS CONSTITUTED FROM A COMBINATION OF PLURAL OF BASIC WORDS.
SINCE A NEW WORD IS ADDED BY A COMBINATION OF WORDS, IT IS DIFFICULT TO COVER REWORD EXPRESSIONS FOR ALL COMPOUND WORDS.

2. SINCE COMPOUND WORDS ARE GENERATED INFINITELY, ALL COMPOUND WORDS ARE NOT INCLUDED IN A DICTIONARY IN ADVANCE.

3. SINCE IN JAPANESE, MANY NOUNS OR AFFIXES CORRESPONDING TO NOUNS ARE CONNECTED TO CREATE COMPOUND NOUNS WITHOUT LIMIT, IT IS IMPOSSIBLE TO REGISTER ALL COMPOUND WORDS IN A DICTIONARY.

4. FOR EXAMPLE, EVEN WHEN A COMPOUND WORD IS KNOWN, IT IS DIFFICULT TO KNOW WHERE THE COMPOUND WORD IS SPLIT. WHILE A PERSON WHO USES JAPANESE AS A NATIVE LANGUAGE MAY NOT THINK THAT THE COMPOUND WORD IS DIFFICULT, A LEARNER THINKS A WORD FORMED BY A COMBINATION OF MANY WORDS VERY DIFFICULT.

A COMPOUND NOUN IS CONSTITUTED BY A SERIES OF RADICALS, AND COMPOUND NOUNS CAN BE GENERATED INFINITELY BY COMBINATIONS OF WORDS.
FOR THIS REASON, IT IS NOT REALISTIC TO WRITE ALL COMBINATIONS IN ADVANCE.

<ref="1">

A COMPOUND WORD IS A WORD WHICH IS CONSTITUTED FROM A COMBINATION OF PLURAL BASIC WORDS. SINCE A NEW WORD IS ADDED BY A COMBINATION OF WORDS, IT IS DIFFICULT TO COVER REWORD EXPRESSIONS FOR ALL COMPOUND WORDS.

</ref>
<ref="2">

SINCE COMPOUND WORDS ARE GENERATED INFINITELY, ALL COMPOUND WORDS ARE INCLUDED IN A DICTIONARY IN ADVANCE.

</ref>
<ref="3">
SINCE IN JAPANESE, MANY NOUNS OR AFFIXES CORRESPONDING TO NOUNS ARE CONNECTED TO CREATE COMPOUND NOUNS WITHOUT LIMIT, IT IS IMPOSSIBLE TO REGISTER ALL COMPOUND WORDS IN A DICTIONARY.
</ref>
<ref="4">
FOR EXAMPLE, EVEN WHEN A COMPOUND WORD IS KNOWN, IT IS DIFFICULT TO KNOW WHERE THE COMPOUND WORD IS SPLIT. WHILE A PERSON WHO USES JAPANESE AS A NATIVE LANGUAGE MAY NOT THINK THAT THE COMPOUND WORD IS DIFFICULT, A LEARNER THINKS A WORD FORMED BY A COMBINATION OF MANY WORDS VERY DIFFICULT.
</ref>
<ref="5">
. . .
</ref>
. . .

NON-TRANSITORY COMPUTER READABLE MEDIUM STORING DOCUMENT CREATION SUPPORT PROGRAM, DOCUMENT CREATION SUPPORT DEVICE, AND DOCUMENT CREATION SUPPORT METHOD

CROSS-REFERENCE TO RELATED APPLICATIONS

This application is based on and claims priority under 35 USC 119 from Japanese Patent Application No. 2012-051294 filed Mar. 8, 2012.

BACKGROUND

1. Technical Field

The present invention relates to a non-transitory computer readable medium storing a document creation support program, a document creation support device, and a document creation support method.

2. Related Art

SUMMARY

According to an aspect of the invention, there is provided a non-transitory computer readable medium storing a document creation support program causing a computer to function as a receiving unit that receives a defined text and edition process information having recorded therein an operation history when creating the defined text including a sentence associated with the operation, a revision range extraction unit that extracts, as a revision range, an operation history corresponding to a preset operation and a sentence associated with the operation history from the edition process information received by the receiving unit, a document feature quantity extraction unit that extracts a first feature quantity from the sentence in the defined text and a second feature quantity from the sentence in the revision range, and a sentence example information search unit that searches for a sentence example associated with a sentence in sentence example information having a sentence example registered in advance in association with feature quantity information of the sentence example on the basis of information of the first feature quantity and the second feature quantity.

BRIEF DESCRIPTION OF THE DRAWINGS

Exemplary embodiments of the present invention will be described in detail based on the following figures, wherein:

FIG. 3A is a schematic view showing a configuration example of edition process information, and FIG. 3B is a schematic view showing an example of a list of variables of edition process information;

FIGS. 4A and 4B are schematic views showing an example of definitive sentences of document information and revision sentences extracted by a revision range extraction unit 103;

FIGS. 5A and 5B are schematic views showing an example of definitive sentences of document information and revision sentences extracted by a revision range extraction unit 103;

FIGS. 6A and 6B show a feature quantity of a definitive sentence and a feature quantity of a revision sentence extracted by a document feature quantity extraction unit;

FIGS. 7A and 7B are schematic views showing an example of a display form of a sentence example which is displayed on a sentence example display.

DETAILED DESCRIPTION

Configuration of Document Creation Support Device

Figure 1:
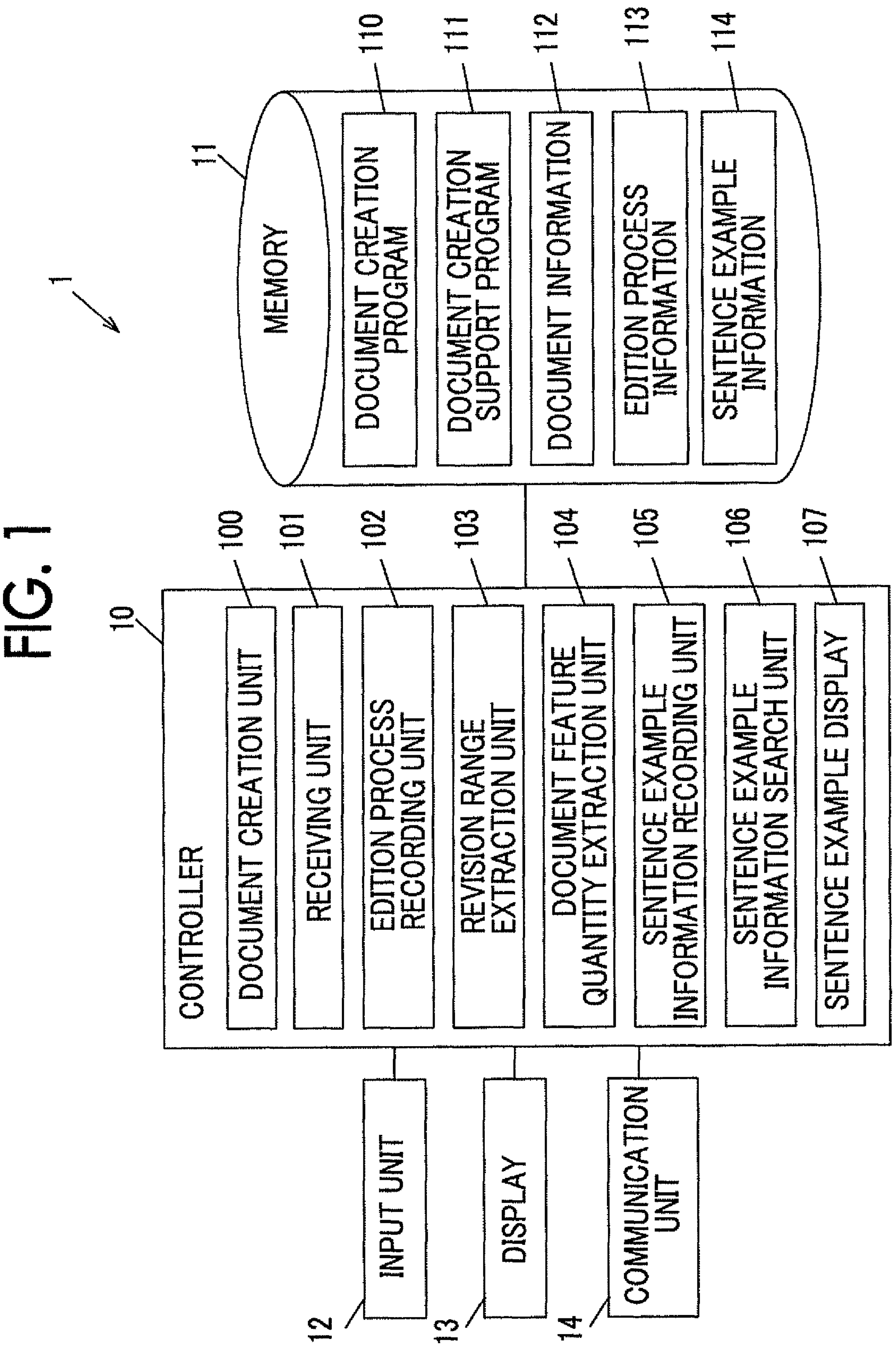
FIG. 1 is a schematic block diagram showing a configuration example of a document creation support device according to an exemplary embodiment of the invention.

FIG. 1 is a schematic block diagram showing a configuration example of a document creation support device according to an exemplary embodiment of the invention.

A document creation support device 1 creates document information, sequentially records an edition process until a text in the document information is defined, and searches and presents a sentence example previously recorded on the basis of the text of the document information and the edition process. Note that in the following description, the term "definition" includes definition of a sentence included in a text, definition of a clause, definition of a word, and the like.

The document creation support device 1 has a controller 10 which is constituted by a Central Processing Unit (CPU) and the like to control respective units and to execute various programs, a memory 11 which is constituted by a storage medium, such as a Hard Disk Drive (HDD), a flash memory, or the like to store information, an input unit 12 which is constituted by a keyboard, a mouse, or the like and used to input an operation signal for operating a document creation unit 100 described below, a display 13 which is constituted by a Liquid Crystal Display (LCD) or the like to display an image and characters, and a communication unit 14 which is used to perform communication with the outside.

The document creation support device 1 is, for example, a computer, and may be a Personal Digital Assistant (PDA), a mobile phone, or the like. With the use of a display and an input unit of an external terminal, the input unit 12 and the display 13 may not be provided, and the device may be constituted as a server.

The controller 10 executes a document creation program 110 described below to function as a document creation unit 100, and executes a document creation support program 111 to function as the edition process recording unit 102, the receiving unit 101, the revision range extraction unit 103, the document feature quantity extraction unit 104, the sentence example information recording unit 105, the sentence example information search unit 106, the sentence example display 107, and the like.

The document creation unit 100 creates document information 112 on the basis of an operation signal input from the input unit 12.

When the document creation unit 100 creates the document information 112, the edition process recording unit 102 records an operation history before the definition of a text in the document information 112 in the memory 11 as edition process information 113 including sentences associated with the operations.

The receiving unit 101 receives the document information 112 being created in the document creation unit 100 and the edition process information 113 of the document information 112 from the edition process recording unit 102. The receiving unit 101 may receive document information created by an external document creation unit and edition process information of the document information.

The revision range extraction unit 103 extracts, as a revision range, an operation history corresponding to a preset operation and a sentence associated with the operation history from the edition process information 113 recorded by the edition process recording unit 102.

The document feature quantity extraction unit 104 extracts the feature quantities of a defined text in the document information 112 and a sentence (revision sentence, described below) included in the revision range extracted by the revision range extraction unit 103.

The sentence example information recording unit 105 records the defined text in the document information 112 as sentence example information 114 along with the feature quantities extracted by the document feature quantity extraction unit 104.

The sentence example information search unit 106 searches for sentence examples associated with the defined text in the sentence example information 114 on the basis of the feature quantity information of the defined text in the document information 112 and the sentence included in the revision range.

The sentence example display 107 displays the sentence examples searched by the sentence example information search unit 106 on the display 13 in an arrangement manner or the like on the basis of conditions.

The memory 11 stores the document creation program 110, such as word processor software, which operates the controller 10 as the above-described document creation unit 100, the document creation support program 111 which operates the controller 10 as the units 101 to 107, the document information 112 which is a set of texts created by the document creation unit 100, the edition process information 113 which includes an operation history before the definition of a text of the document information 112 and sentences associated with the operations, the sentence example information 114 which is recorded by the sentence example information recording unit 105, and the like.

Figure 2:
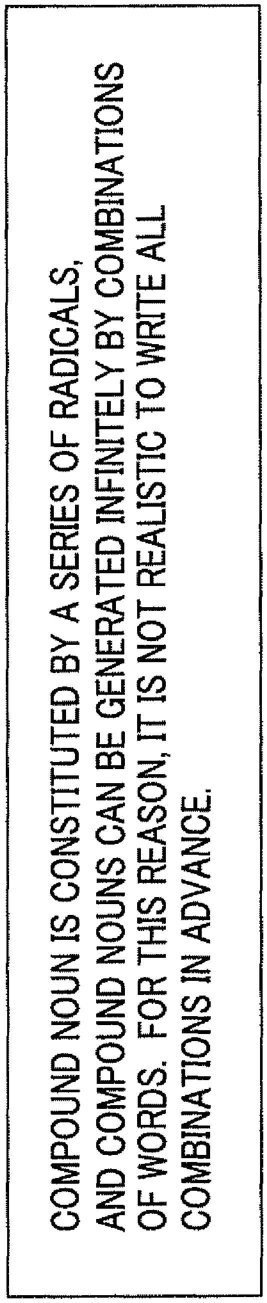
FIG. 2 is a schematic view showing a configuration example of document information.

FIG. 2 is a schematic view showing a configuration example of document information.

The document information 112 is information in which a text including multiple sentences is described in the form of text data or the like. Document creation is performed by operations of text input, correction, deletion or copy, cut, paste, UNDO, REDO, and the like. These operations during creation are recorded as the edition process information 113 described below.

FIG. 3A is a schematic view showing a configuration example of edition process information, and FIG. 3B is a schematic view showing an example of a list of variables of edition process information.

In the edition process information 113 shown in FIG. 3A, the operations in the operation history are described with the variables shown in FIG. 3B. In this exemplary embodiment, any one of the operations which may be performed is "date" which represents operation date, "act" which represents operation content, such as input, correction, deletion, copy, cut, or paste, "ctrl" which represents edition content, such as UNDO or REDO, and "link" which represents link of copy (cut) and paste in the same document, and other variables may be added.

The combination of each of the above-listed operations may be also performed.

An edition process may be recorded for each word or morpheme, or may be recorded for each range defined by character input means, such as IME.

Further, a link of copy (cut) and paste in the same document is created, for example, as follows.

When a copy (cut) command is executed, the copy content and the environment in which the copy (cut) command is executed are recorded.

When a paste command is executed, it is checked whether or not the paste content and the environment in which the paste command is executed match.

When the paste content and the execution environment match, a link is created.

The edition process information 113 is information which is normally held internally, and is not displayed to the user. However, when the user wants to view the edition records, the edition process information 113 may be displayed on the display 13 as an optional item or the like.

Operation of Document Creation Support Device

Hereinafter, the operation of the document creation support device 1 will be described with reference to FIGS. 1 to 8 in (1) basic operation, (2) document information analysis operation, and (3) sentence example search and presentation operation.

(1) Basic Operation

Figure 8:
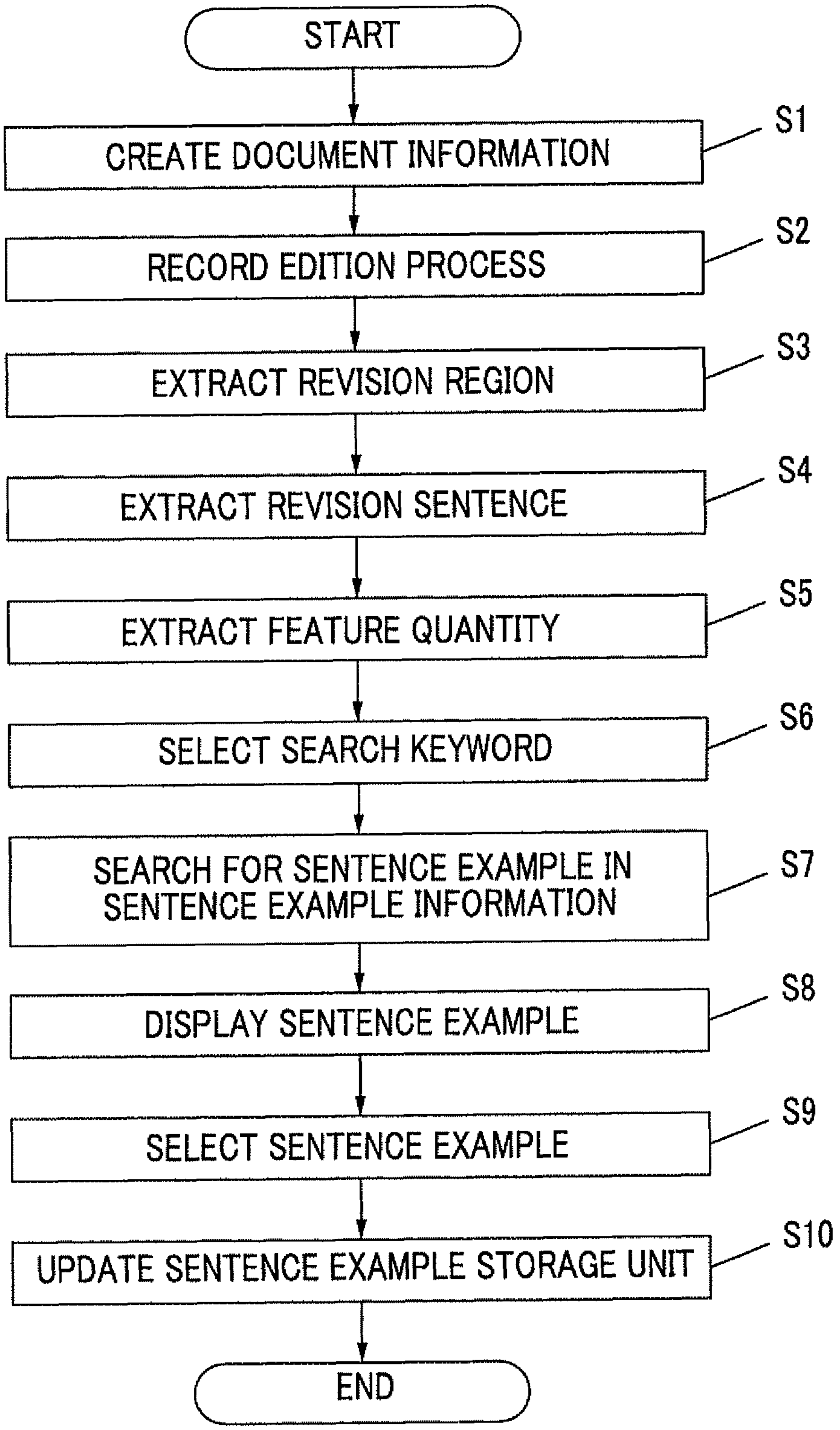
FIG. 8 is a flowchart showing an example of the operation of a document creation support device.

FIG. 8 is a flowchart showing an example of the operation of the document creation support device.

First, the document creation unit 100 creates document information 112 on the basis of an operation signal input from the input unit 12 (S1).

When the document creation unit 100 creates the document information 112, the edition process recording unit 102 records an operation history before the definition of a text in the document information 112 in the memory 11 as edition process information 113 shown in FIG. 3 including sentences associated with the operations (S2).

(2) Document Information Analysis Operation

Next, the receiving unit 101 receives the document information 112 being created in the document creation unit 100 and the edition process information 113 of the document information 112 from the edition process recording unit 102.

Next, the revision range extraction unit 103 extracts, as a revision range, an operation history corresponding to a preset operation and a sentence associated with the operation history from the edition process information 113 recorded by the edition process recording unit 102 (S3).

The revision range extraction unit 103 uses, for example, the following condition as the preset operation described above.

writing or erasure is done many times in a single sentence, multiple sentences, or a paragraph That is, the revision range extraction unit 103 extracts a location where "act="write"" and "act="delete"" appear many times in a single sentence, multiple sentences, or a paragraph from the edition records recorded by the edition process recording unit 102. Meanwhile, when the region (single sentence, multiple sentences, or a paragraph) is finally erased by "act="delete"", the region is determined as an unwanted region and is not extracted.

The revision range extraction unit 103 extracts the revision range under the following conditions, in addition to the above-described condition.

there are many line feeds in a single sentence, multiple sentences, or a paragraph a phrase, a clause, a single sentence, multiple sentences, or a paragraph is duplicated many times by copy (cut) and paste words or short sentences are listed by item a document creation operation is not performed for a given time or more a specific word, such as "TODO", "FIXME", or "*correction required", appears an informal expression, such as "write later" or "write about something", appears abruptly The revision range extraction unit 103 may extract the revision range by user's instruction.

FIGS. 4A and 4B are schematic views showing an example of definitive sentences of the document information 112 and revision sentences extracted by the revision range extraction unit 103.

First, as shown in FIG. 4B, the revision range extraction unit 103 extracts revision sentences 113*a* to 113*m* from the revision range (S4). The revision sentences are extracted within the revision range in the following procedure.

1. "rev" is referenced in an ascending order of management numbers from the edition records of the revision range
2. "rev" of which "date" is close to each other are gathered to acquire a single-time editing operation
3. When "rev" being referenced has "link", the edition records of "rev" that have the same link number as "rev" being referenced and that are younger than "rev" being referenced, and the revision range associated with the edition records are included in the current revision range
4. in the edition records created before "rev" being referenced, edition records other than "act="delete"" are extracted as revision sentences together with the edition records of "rev" being referenced
5. in order to emphasize the edition records of "rev" being referenced, a tag or mark is put in the edition records of "rev" being referenced (hereinafter, for description, [boldface])

A boldfaced empty parenthesis ([ ]) represents an edition record of only deletion.

The revision range extraction unit 103 treats the text of the document information 112 as definitive sentences 112*a* and 112*b* as shown in FIG. 4A.

FIGS. 5A and 5B are schematic views showing an example of definitive sentences of the document information 112 and revision sentences extracted by the revision range extraction unit 103.

Next, the revision range extraction unit 103 checks whether or not the revision regions (in [ ]) of the revision sentences 113*a* to 113*m* shown in FIG. 4B seem to be a natural sentence. Thereby, for example, when the user types randomly in desperation, the revision range extraction unit 103 removes typing mistakes and the like. Further, the revision range extraction unit 103 deletes revision sentences same as the definitive sentences 112*a* and 112*b* because of duplication of the contents. With the above-described operation, the revision range extraction unit 103 extracts revision sentences 103*a* to 103*i* shown in FIG. 5B.

FIGS. 6A and 6B show a feature quantity of a definitive sentence and a feature quantity of a revision sentence extracted by the document feature quantity extraction unit 104.

Next, the document feature quantity extraction unit 104 extracts the feature quantities of the definitive sentences 112*a* and 112*b* and the revision sentences 103*a* to 103*i* (S5).

As an example of the feature quantities to be extracted, the feature quantity shown in FIG. 6A is extracted from the definitive sentence 112*a*, and the feature quantity shown in FIG. 6B is extracted from the revision sentence 103*c*.

The feature quantities to be extracted by the document feature quantity extraction unit 104 are as follows.

morpheme information part of speech information syntax/semantic information

Tf-idf value

N-gram feature vector of single sentence, multiple sentences, or paragraph

Other feature quantities may be used insofar as the feature quantities are used in a general search method.

The sentence example information recording unit 105 records the definitive sentences 112*a* and 112*b* and the revision sentences 103*a* to 103*i* as the sentence example information 114 along with the feature quantities extracted by the document feature quantity extraction unit 104. The sentence example information 114 is used in the next sentence example search.

(3) Sentence Example Search/Presentation Operation

Next, the sentence example information search unit 106 searches for associated sentence examples in the sentence example information 114 on the basis of the feature quantities of the definitive sentences 112*a* and 112*b* and the revision sentences 103*a* to 103*i*.

First, the sentence example information search unit 106 selects a search keyword (S6). The sentence example information search unit 106 uses any one of the feature quantities, such as morpheme information, part of speech information, syntax/semantic information, Tf-idf value, N-gram, and a feature vector of a single sentence, multiple sentences, or a paragraph, or a combination of these feature quantities as the search keyword.

Next, the sentence example information search unit 106 performs a sentence example search in any one or a combination of the following sentences. That is, sentence examples similar to the definitive sentences 112*a* and 112*b* are searched sentence examples similar to the revision sentences 103*a* to 103*i* are searched the feature quantities of all of the definitive sentences 112*a* and 112*b* are combined, and sentence examples similar to those feature quantities are searched the feature quantities of all of the revision sentences 103*a* to 103*i* are combined, and sentence examples similar to those feature quantities are searched the feature quantities of all of the definitive sentences 112*a* and 112*b* and the revision sentences 103*a* to 103*i* are combined, and sentence examples similar to those feature quantities are searched sentence examples relating revision sentences similar to the revision sentences 103*a* to 103*i* are searched the feature quantities of all of the revision sentences 103*a* to 103*i* are combined, and sentence examples relating feature quantities of revision sentences similar to those feature quantities are searched At this time, in order to avoid excessive duplication of the feature quantities of the revision sentences, the feature quantities of the revision sentences may be restricted under the following conditions.

only feature quantities associated with changed edition portion ([boldface]) are used (for example, when syntactic dependency is used for a feature quantity, only hatched regions of FIG. 6B are used as the feature quantities)

only feature quantities which are changed caused by delete operation are used (for example, in regard to the revision sentence 103*e* of FIG. 5B, when syntactic dependency is used for feature quantities, feature quantities which are changed in syntactic dependency of the revision sentence 103*e* compared with the revision sentence 103*d* are used as the feature quantities)

Specifically, the sentence example information search unit 106 divides the definitive sentences 112*a* and 112*b* and the revision sentences 103*a* to 103*i* shown in FIGS. 5A and 5B into five groups.

(a) definitive sentence 112*a*, revision sentence 103*i*

(b) definitive sentence 112*b*, revision sentence 103*j*

(c) revision sentence 103*a*, revision sentence 103*b*, revision sentence 103*c*

(d) revision sentence 103*d*, revision sentence 103*e*, revision sentence 103*f*, revision sentence 103*g*

(e) revision sentence 103*h*

Then, a sentence example similar to the feature quantity of each group is searched (S7). The sentence example information search unit 106 may search for a sentence example having a revision sentence similar to the feature quantity of each group.

The sentence example search of the sentence example information search unit 106 is performed at the timing based on one of the following conditions or a combination.

a sentence example search is performed by a user's instruction a revision range in the vicinity of a current edition point is extracted, and a sentence example search is performed when there is a revision range outside a current edition point, a sentence example search in this region is performed when a document creation operation is not performed for a given time or more, a sentence example search is performed when a specific word, such as "TODO", "FIXME", or "*correction required", appears, a revision range in the vicinity of the specific word is extracted, and a sentence example search is performed when an informal expression, such as "write later" or "write about something", appears abruptly, a revision range in the vicinity of the informal expression is extracted, and a sentence example search is performed FIGS. 7A and 7B are schematic views showing an example of a display form of a sentence example which is displayed on the sentence example display 107.

Next, as shown in FIG. 7A, the sentence example display 107 displays sentence examples searched by the sentence example information search unit 106 on the display 13 as a sentence example display 107*a* in a pop-up manner or the like on document information 112 (S8).

As shown in FIG. 7B, the sentence example display 107 may display a sentence example display 107*b* in a form of being embedded in the text of the document information 112 being currently edited.

The sentence example displays 107*a* and 107*b* may be arranged on the basis of conditions, and the display order of the sentence examples is determined by the following methods which are used in a general search method.

registration order of sentence examples coincidence to search keyword usage count of sentence examples In this exemplary embodiment, the coincidence between the feature quantities of the revision sentences 103*a* to 103*i* and the feature quantities of the revision sentences of the sentence examples may be considered to the display order of the sentence examples.

Next, the user selects a desired sentence from the sentence examples displayed in the sentence example displays 107*a* and 107*b* of FIGS. 7A and 7B (S9). In the example of FIG. 7A, a sentence may be selected, copied (cut), and pasted at an appropriate position by a mouse or the like. In the example shown in FIG. 7B, a sentence may be used with a tag removed.

In regard to the sentence example selected on the sentence example display 107*a* or 107*b*, the sentence example information recording unit 105 updates the usage count of the selected sentence example in the sentence example information 114 (S10).

Effects of Exemplary Embodiment

According to the above-described exemplary embodiment, in addition to the definitive sentences in the document information 112, the revision sentences are also extracted from the text in the edition process information 113, the feature quantities are extracted from the definitive sentences and the revision sentences, and the sentence examples are searched on the basis of the feature quantities of the definitive sentences and the revision sentences. Therefore, it is possible to search and present sentence examples in which the user's intention of edition is reflected compared to a case where sentence examples are searched on the basis of only definitive sentences.

Since the definitive sentences, the revision sentences, and the feature quantities thereof are recorded as the sentence example information 114, it is possible to record sentence examples in which the user's intention of edition is reflected.

Other Exemplary Embodiments

The invention is not limited to the foregoing exemplary embodiment, and various modifications may be made without departing from the scope of the invention. For example, an omission extraction unit may be further provided to extract write omission. The term "write omission" refers to a sentence which satisfies the following conditions.

a sentence or word in an edition record which undergoes "act="delete""

there is no sentence or word having the content similar to a created text the amount of information of a sentence or word is large (the Tf-idf value of a word in a text, or the like)

A write omission display is further provided to display write omission extracted by the write omission extraction unit. As a display method, a method similar to the sentence example displays 107*a* and 107*b* shown in FIGS. 7A and 7B may be used. That is, the write omission display displays write omission at the location of edition process information 113 extracted by the write omission extraction unit or at the end of the sentence in the document information 112.

Identification information of a user may be recorded in association with the sentence example information 114. As a document creation completion flag, with the following conditions as a trigger, user's instruction document save execution document creation editor end individual sentence example information is prepared in the memory 11, and a created text is registered.

The document creation support program ill may be provided in a state of being stored in a storage medium, such as a CD-ROM, or may be downloaded from a server device connected to a network, such as Internet, to a memory in the device. Some or all of the document creation unit 100, the edition process recording unit 102, the receiving unit 101, the revision range extraction unit 103, the document feature quantity extraction unit 104, the sentence example information recording unit 105, the sentence example information search unit 106, the sentence example display 107, and the like may be realized by hardware, such as an ASIC. The respective steps shown in the operation description in the foregoing exemplary embodiment may be changed in sequence, and steps may be omitted or added.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a document creation support program causing a computer to function as:

a receiving unit that receives: (1) a defined text, and (2) edition process information, the edition process information having recorded therein an operation history when creating the defined text, and the defined text including a sentence associated with the operation;

a revision range extraction unit that extracts a revision range where a preset operation writing or erasure appear a plurality of times in a sentence associated with the operation history from the edition process information received by the receiving unit;

a document feature quantity extraction unit that determines, as a first feature quantity, the number of occurrences of words in the sentence in the defined text and determines, as a second feature quantity, the number of occurrences of words in a revised version of the sentence in the defined text, the revised version being associated with in the revision range; and a sentence example information search unit that searches for sentences in sentence example information based on both (1) the first feature quantity of occurrences of a word or phrase and (2) the second feature quantity of occurrences of a word or phrase.

2. The non-transitory computer readable medium according to claim 1, wherein the document creation support program causes the computer to further function as a sentence example display that displays the sentence example information searched by the sentence example information search unit on the basis of conditions.

3. The non-transitory computer readable medium according to claim 1, wherein the document creation support program causes the computer to further function as a sentence example information recording unit that additionally records the sentence in the defined text and the sentence in the revision range to the sentence example information in association with the first feature quantity and the second feature quantity.

4. The non-transitory computer readable medium according to claim 2, wherein the document creation support program causes the computer to further function as a sentence example information recording unit that additionally records the sentence in the defined text and the sentence in the revision range to the sentence example information in association with the first feature quantity and the second feature quantity.

5. A document creation support device comprising:

a receiving unit that receives (1) a defined text, and (2) edition process information, the edition process information having recorded therein an operation history when creating the defined text, and the defined text including a sentence associated with the operation;

a revision range extraction unit that extracts a revision range where a preset operation writing or erasure appear many times in a sentence associated with an operation history from the edition process information received by the receiving unit;

a document feature quantity extraction unit that determines, as a first feature quantity, the number of occurrences of words in the sentence in the defined text and determines, as a second feature quantity, the number of occurrences of words in a revised version of the sentence in the defined text, revised version being associated with in the revision range; and a sentence example information search unit that searches for sentences in sentence example information based on both (1) the first feature quantity of occurrences of a word or phrase and (2) the second feature quantity of occurrences of a word or phrase.

6. A document creation support method comprising:

receiving (1) a defined text, and (2) edition process information, the edition process information having recorded therein an operation history when creating the defined text, and the defined text including a sentence associated with the operation;

extracting a revision range where a preset operation writing or erasure appear predetermined times and more in a sentence associated with an operation history from the received edition process information;

determining, as a first feature quantity, the number of occurrences of words in the sentence in the defined text and determines, as a second feature quantity, the number of occurrences of words in a revised version of the sentence in the defined text, the revised version being associated with in the revision range; and searching for sentences in sentence example information based on both (1) the first feature quantity of occurrences of a word or phrase and (2) the second feature quantity of occurrences of a word or phrase.

7. The non-transitory computer readable medium according to claim 1, wherein the revision range extraction unit extracts the revision range where the preset operation writing or erasure appears many times in the sentence associated with an operation history from the edition process information received by the receiving unit.

8. The non-transitory computer readable medium according to claim 1, wherein the revision range extraction unit extracts the revision range where the preset operation writing or erasure appears predetermined times and more in the sentence associated with an operation history from the edition process information received by the receiving unit.

* * * * *